Patented Oct. 17, 1944

2,360,555

UNITED STATES PATENT OFFICE 2,360,555

PREPARATION OF CYCLIC MONO-OLEFINS

Theodore W. Evans and Rupert C. Morris, Berkeley, and Edward C. Shokal, Oakland, Calif., assignors to Shell Development Company, San Francisco, Calif., a corporation of Delaware No Drawing. Application March 17, 1942,
Serial No. 435,076

10 Claims. (Cl. 260—666)

This invention relates to the production of cyclic mono-olefins from the corresponding cyclic diolefins. More particularly, the invention provides a practical and economical method for selectively hydrogenating one of the two double bonds of a cyclic diolefin to produce the corresponding cyclic mono-olefin.

The invention is of particular value in that it provides a technically feasible process for the production of cyclopentene from cyclopentadiene. Cyclopentadiene is an easily produced, readily available and inexpensive material of quite limited usefulness in the field of organic synthesis, while cyclopentene is a comparatively expensive material which is not readily available and which is difficult and costly to prepare by known methods. One known method for preparing cyclopentene consists in chlorinating cyclopentane to cyclopentyl chloride and dehydrochlorinating the cyclopentyl chloride to cyclopentene. This method is too costly to warrant serious technical consideration and its usefulness moreover is in large measure dependent on the availability of pure cyclopentane. While cyclopentane is present in relatively small amounts in some petroleum fractions, it is difficult to separate it therefrom free of 2,2-dimethyl butane which has a boiling temperature differing from that of cyclopentane by only about 0.2° C. Cyclopentadiene, on the other hand, is commercially available as a by-product of the petroleum industry and is readily recovered in a pure state from hydrocarbon fractions by selective polymerization to dicyclopentadiene followed by cracking of the dimer to monomeric cyclopentadiene.

The invention is applicable to the conversion of any cyclic diolefin containing two double bonds in conjugated relationship in the alicyclic ring to the corresponding cyclic mono-olefin containing the same number of carbon atoms. The treated cyclic diolefin may have all of its carbon atoms in the alicyclic ring as in cyclopentadiene, or one or more carbon atoms may be outside of the ring as in methyl cyclopentadiene, dimethyl cyclopentadiene, and the like. One or more radicals, such as alkyl, alkenyl, cycloalkyl, cycloalkenyl, aryl, aralkyl, aralkenyl, and the like hydrocarbon or substituted hydrocarbon radicals, may be linked to one or more of the carbon atoms contained in the alicyclic diolefinic ring. Representative compounds of the class to which the process of the invention is applicable are cyclopentadiene, methyl cyclopentadiene, dimethyl cyclopentadiene, ethyl cyclopentadiene, cyclohexadiene-1,3, methyl cyclohexadiene-1,3, ethyl cyclohexadiene-1,3, the conjugated double bond cycloheptadienes, the menthadienes, such as alpha-phellandrene and alpha- and gamma-terpinenes and the like and their homologues and suitable substitution products.

According to the invention, the selective hydrogenation of one of the two conjugated double bonds of the treated cyclic diolefin to produce the corresponding cyclic mono-olefin is accomplished by conducting the hydrogenation in the liquid phase in the presence of an active hydrogenation catalyst under a moderate pressure at a relatively low temperature and with substantially less than the stoichiometrical amount of hydrogen theoretically required to completely reduce the cyclic diene to the corresponding cyclic mono-olefin.

By moderate pressure is meant pressures only moderately in excess of atmospheric pressure, i. e., 2 to 5 atmospheres absolute. The preferred temperature range is from 0° C. to 40° C., but somewhat higher temperatures up to about 100° C. may in some cases be employed advantageously. Operating temperatures greater than 100° C. are not recommended as such temperatures frequently result in a decreased yield of the desired mono-olefin due to polymerization and other undesirable side reactions. Generally speaking, both the temperature and pressure should be kept as low as possible consistent with a reasonable rate of hydrogenation, and, when a faster rate of reaction than that being attained is desired, it is preferable to effect it by increasing the pressure rather than the temperature.

When a cyclic diolefin of conjugated double bond character is reacted with an amount of hydrogen equivalent to or greater than the amount required by theory to completely reduce it to the corresponding cyclic mono-olefin, substantial quantities of the corresponding cyclo-paraffin are also formed. A feature of the present hydrogenation resides in the application thereto of the discovery that if less than the quantity of hydrogen theoretically necessary to convert all of the cyclic diolefin to the corresponding cyclic mono-olefin is applied and the conditions of hydrogenation, such as pressure and temperature, are carefully controlled within the limits herein set out, the result is not proportionate reduction of the amounts of cyclic mono-olefin and cyclo-paraffin formed as would be expected, but rather formation of the cyclo-olefin in good yield while the formation of the cyclo-paraffins is completely or substantially obviated. The relative amount of the hydrogen to cyclodiolefin present in the reaction zone may vary within relatively wide limits, but in general from about 65 to 85 mol % of the amount of hydrogen theoretically required to convert all of the treated cyclodiolefin to the desired cyclic mono-olefin is preferred.

In the execution of the invention, it has been found that particularly good results follow from the use of a pyrophoric nickel metal catalyst, such as Raney nickel. However, good results can also be obtained by using relatively inexpensive and readily regenerated base metal catalysts which possess the desired degree of activity. For example, the metals as iron, cobalt, copper, chromium and thallium are particularly active and efficacious catalysts when employed in a finely divided state or deposited on a suitable carrier. The oxides of the metals, particularly the oxides of nickel, cerium, thorium, chromium and zirconium or mixtures comprising two or more metal oxides or one or more metal oxides with one or more metals, have been found useful as catalysts and components of catalyst mixtures. In some cases, compound catalysts comprising two or more metals in admixture or alloyed as, for example, silver-copper, copper-chromium, copper-zinc, nickel-cobalt, nickel-zinc, etc., are valuable catalysts. Although the base metal catalysts are generally preferred, catalysts of the desired activity may also be selected from the group consisting of the noble metals as silver, gold, platinum, palladium, osmium, ruthenium, rhodium and iridium.

The catalysts may be prepared by any suitable method and employed severally or in combination or in admixture. The metal hydrogenation catalysts are preferably employed in a finely divided state. Any suitable hydrogenation catalyst may be incorporated with or deposited on a relatively inert substance or carrier as pumice, charcoal, alumina, silica gel, kieselguhr and the like. In many cases, the activity of a selected catalyst may be considerably enhanced by incorporating therewith small quantities of other substances capable of acting as promoters. A class of suitable promoters includes the high melting and difficultly reducible oxygen-containing compounds, in particular, the oxides and oxygen-containing salts of elements as the alkaline earth and rare earth metals, beryllium, magnesium, aluminum, copper, thorium, manganese, uranium, vanadium, columbium, tantalum, chromium, boron, zinc and titanium. A particularly suitable group of promoters includes the difficultly soluble phosphates, molybdates, tungstates and selenates of the above listed metals, or the oxygen-containing reduction products of such compounds as, for example, the selenates.

In the hydrogenation of cyclopentadiene, it has been found that 3 to 5 grams of Raney nickel for each 4 mols of cyclopentadiene give sufficiently rapid hydrogenation under the preferred conditions of pressure and temperature and that increasing or decreasing this ratio has a corresponding effect upon the rate of hydrogenation, other conditions being equal. As preferably employed, the catalyst is maintained in a dispersed state throughout the body of the liquid hydrocarbon reactant by means agitating the reactor itself or by stirring means within the reactor.

If it is desired to conduct the reaction in dilute solution, dilution may be effected through the addition of any solvent stable under the conditions of the process and not a catalyst poison whose boiling point is such as to render it easily separable from the reaction mixture at the stage where it is desired to effect separation. Benzene and ethanol answer these requirements with relation to the reduction of cyclopentadiene. Other suitable solvents where nickel is used as a catalyst are tetralin (hydrogenated naphthalene) dioxane, iso-octane and the ethers such as ethyl ether, di-isopropyl ether and the like. If preferred, dilution can also be effected by adding-back or recycling a portion of the reaction product.

The following example is introduced for the purpose of illustrating a mode of executing the invention and the results thereby obtained:

*Example*

A suitable hydrogenation reactor was charged with about 4 mols of freshly prepared cyclopentadiene and from 3 to 5 grams of Raney nickel. The material rapidly took up hydrogen admitted at a pressure of about 2 or 3 atmospheres upon shaking, and when about 3 mols of hydrogen had been used the reaction was stopped. The catalyst was removed and the liquid was heated to approximately 100° C. for a sufficient period of time (about one-half day) to dimerize the unhydrogenated cyclopentadiene. On fractionation the reaction product analyzed 97% cyclopentene.

Upon completion of the hydrogenation, any hydrogenation catalyst which may be present may be removed by any suitable means such as decantation, filtration, centrifugation, etc. Recovery of the cyclic mono-olefin reaction product from the unreacted cyclic diolefin may then be effected by fractional distillation wherever possible, otherwise by chemical or other means. A convenient method for separating cyclopentene from cyclopentadiene is to subject the reaction mixture to a polymerization treatment to dimerize the cyclopentadiene. This brings about a wide difference in boiling points, and the cyclopentene is easily distilled off. In the absence of such a dimerizing step, separation of cyclopentene from cyclopentadiene by fractional distillation is difficult, as the boiling points of the two compounds are quite close (cyclopentene 43° C.–45° C., cyclopentadiene 40°–42° C.). If desired, the separated cyclopentene may be further fractionated, but if the hydrogenation has been properly controlled this procedure is usually unnecessary unless the use in prospect for the cyclopentene demands an absolutely pure material.

While the polymerization of cyclopentadiene is accelerated by heat, as in the case of most other polymerizable substances, moderate temperatures must be employed to produce the dimer, as excessive heating, particularly if prolonged for any appreciable period, results in the formation of more complex polymers such as tetra- and penta-cyclopentadiene which are a great deal more difficult to depolymerize without excessive decomposition. It has been found that the formation of these higher polymers can be prevented and, conversely, that the formation of the easily depolymerized dimer can be selectively accomplished in the presence of cyclopentene if the temperature applied to the reacted mixture is not permitted to substantially exceed 100° C. At this temperature a conversion of 95% of the monomer to the dimer has been achieved without the aid of a catalyst.

The formation of the readily depolymerizable dimer of cyclopentadiene rather than one of its more complex polymers is desirable from the standpoint of re-using the unreacted cyclopentadiene. Depolymerization of dicyclopentadiene to the monomer is easily accomplished by heating the dimer at a temperature of 160° C.-200° C. under reduced pressure in a conventional cracking still. In large scale operation the dimer is preferably introduced into the still in a gradual manner so as to maintain a relatively low level therein. This procedure, accompanied by immediate withdrawal and cooling of the cracked vapors, disfavors the formation of the higher polymers which might otherwise occur. It is unnecessary, however, in small scale operation wherein the entire quantity of dicyclopentadiene involved may be safely charged to the still at once. The depolymerized material should be re-used without appreciable delay as substantial polymerization of cyclopentadiene occurs upon standing. It is to be noted that the temperature necessary to convert dicyclopentadiene to the monomer (160° C.-200° C.) precludes the possibility of any depolymerization of the dimer and consequent contamination of the cyclopentene taking place during separation of the cyclopentene from the dimerized cyclopentadiene by fractional distillation, a temperature of 60° C. being adequate for this purpose.

Although the process of the invention has not been specifically described as applied to the production of the various menthenes from the menthadienes, this application is apparent. It is likewise apparent that the various substituted cyclic mono-olefins may be prepared from the corresponding substituted cyclic diolefins, as for example dimethyl-cyclohexene from dimethyl-cyclohexadiene.

The cyclo mono-olefins obtained by execution of the process of the invention are useful as intermediates, furnishing the starting point for a number of important syntheses. Two important compounds obtainable from cyclopentene through cyclopentanol are glutaric and succinic acids. Cyclopentene is also a very desirable raw material for the production of maleic, malic, fumaric and tartaric acids and their derivatives.

The invention claimed is:

1. A process for effecting the selective hydrogenation of cyclopentadiene to cyclopentene which comprises contacting cyclopentadiene and an amount of hydrogen equal to from about 65% to about 85% of the amount of hydrogen necessary to hydrogenate all of the cyclopentadiene to cyclopentene with a pyrophoric nickel metal catalyst under a pressure of from about 2 to about 5 atmospheres and at a temperature between about 0° C. and about 40° C.

2. A process for effecting the selective hydrogenation of cyclopentadiene to cyclopentene which comprises contacting cyclopentadiene and an amount of hydrogen substantially less than would be required to hydrogenate all of the cyclopentadiene to cyclopentene with an active hydrogenation catalyst under a pressure moderately in excess of atmospheric pressure and at a temperature between about 0° C. and about 40° C.

3. A process for effecting the selective hydrogenation of cyclopentadiene to cyclopentene which comprises contacting cyclopentadiene and an amount of hydrogen substantially less than would be required to hydrogenate all of the cyclopentadiene to cyclopentene with an active hydrogenation catalyst under a pressure moderately in excess of atmospheric pressure and at a temperature between about 0° C. and about 100° C.

4. A process for effecting the selective hydrogenation of one of the two double bonds of a conjugated cyclic diolefin in which both of said double bonds are within the alicyclic ring, to produce the corresponding cyclic mono-olefin which comprises contacting the cyclic diolefin with an amount of hydrogen equal to from about 65% to about 85% of the amount of hydrogen necessary to hydrogenate all of the cyclic diolefin to the cyclic mono-olefin with a pyrophoric nickel metal catalyst under a pressure of from about 2 to about 5 atmospheres and at a temperature between about 0° C. and about 40° C.

5. A process for effecting the selective hydrogenation of one of the two double bonds of a conjugated cyclic diolefin in which both of said double bonds are within the alicyclic ring, to produce the corresponding cyclic mono-olefin which comprises contacting the cyclic diolefin and an amount of hydrogen substantially less than would be required to hydrogenate all of the cyclic diolefin to the cyclic mono-olefin, with an active hydrogenation catalyst under a pressure moderately in excess of atmospheric pressure and at a temperature between about 0° C. and about 100° C.

6. A process for the production of cyclopentene from cyclopentadiene which comprises reacting the cyclopentadiene with 65% to 85% of the stoichiometrical amount of hydrogen in the presence of a pyrophoric nickel metal catalyst, the reaction being conducted under a pressure moderately in excess of atmospheric pressure and at a temperature between 0° C. and 100° C., heating the resulting hydrocarbon mixture comprising cyclopentene and unreacted cyclopentadiene at a temperature not substantially in excess of 100° C. to effect the selective polymerization of the latter to dimeric cyclopentadiene, separating the dimeric cyclopentadiene from the cyclopentene and other constituents of the mixture, and heating the separated dimeric cyclopentadiene at a temperature within the range of 160° C. to 200° C. and under reduced pressure to convert it to monomeric cyclopentadiene.

7. A process for the production of cyclopentene from cyclopentadiene which comprises reacting the cyclopentadiene with less than the stoichiometrical amount of hydrogen in the presence of a hydrogenation catalyst, the reaction being conducted at a pressure moderately in excess of atmospheric pressure and at a temperature within the range of 0° C. to 100° C., treating the resulting hydrocarbon mixture comprising cyclopentene and cyclopentadiene under polymerizing conditions at which the cyclopentadiene is selectively and substantially completely polymerized to dimeric cyclopentadiene, separating the dimeric cyclopentadiene from the cyclopentene and other constituents of the reaction mixture and subjecting the separated dimeric cyclopentadiene to depolymerizing conditions to convert it to monomeric cyclopentadiene.

8. A process for the production of a cyclic mono-olefin from the corresponding cyclic diolefin which comprises reacting a cyclic diolefin containing two double bonds within the alicyclic ring, with less than the stoichiometrical amount of hydrogen in the presence of a hydrogenation catalyst, the reaction being conducted at a pressure moderately in excess of atmospheric pressure and at a temperature within the range of 0° C. to 100° C., treating the resulting hydrocarbon mixture comprising the cyclic mono-olefin and the unreacted portion of the cyclic diolefin to effect the selective polymerization of the latter to a depolymerizable polymer, separating the depolymerizable polymer from the cyclic mono-olefin and other constituents of the mixture and subjecting the separated depolymerizable polymer to depolymerizing conditions to convert it to the monomer.

9. A process for effecting the selective hydrogenation of one of the two double bonds of a monocyclic hydrocarbon containing the double bonds in conjugated position within the ring of said monocyclic hydrocarbon, to produce the corresponding monocyclic mono-olefin, which comprises contacting the monocyclic diolefin with an amount of hydrogen equal to from about 65% to about 85% of the amount of hydrogen necessary to hydrogenate all of the monocyclic diolefin to the monocyclic mono-olefin, in the presence of a pyrophoric nickel metal catalyst, under a pressure of from about 2 to about 5 atmospheres, and at a temperature of between about 0° C. and about 40° C.

10. A process for the production of a monocyclic mono-olefin from the corresponding monocyclic diolefin, which comprises reacting a monocyclic diolefin containing two double bonds within the alicyclic ring, with less than the stoichiometric amount of hydrogen in the presence of a hydrogenation catalyst, the reaction being conducted at a pressure moderately in excess of atmospheric pressure and at a temperature within the range of from 0° C. to 100° C., treating the resulting hydrocarbon mixture comprising the monocyclic mono-olefin and unreacted portion of the monocyclic diolefin to effect the selective polymerization of the latter to a depolymerizable polymer, separating the depolymerizable polymer from the monocyclic mono-olefin and the other constituents of the mixture, and subjecting the separated depolymerizable polymer to depolymerizing conditions to convert it to the monomer.

THEODORE W. EVANS.
RUPERT C. MORRIS.
EDWARD C. SHOKAL.